United States Patent [19]
DeMino

[11] 3,777,389
[45] Dec. 11, 1973

[54] FISHING ROD HOLDER

[76] Inventor: Angelo DeMino, 10349 Glory Ave., Tujunga, Calif. 91042

[22] Filed: Aug. 23, 1972

[21] Appl. No.: 283,129

[52] U.S. Cl. ............................................. 43/15
[51] Int. Cl. ........................................ A01k 97/12
[58] Field of Search ................................. 43/15

[56] References Cited
UNITED STATES PATENTS

| 3,154,875 | 11/1964 | Biddison | 43/15 |
| 3,660,921 | 5/1972 | McDonnell | 43/15 |
| 3,410,015 | 11/1968 | Garcia, Jr. | 43/15 |

Primary Examiner—Louis G. Mancene
Assistant Examiner—J. Q. Lever
Attorney—Dominick Nardelli

[57] ABSTRACT

A fishing rod holder is described having a tubular member in which the handle of the rod is inserted. The member is mounted on a support to pivot about a horizontal axis and is engaged by an adjustable spring to prevent the weight of the rod from pivoting it downward. Between the member and the support forward of the pivot is mounted a mouse-trap like spring, and means for cocking the trap spring under force. A spring release is provided to trigger the trap spring whenever the rod is pivoted downward, due to the pull of a fish working against the action of the adjustable spring.

9 Claims, 3 Drawing Figures

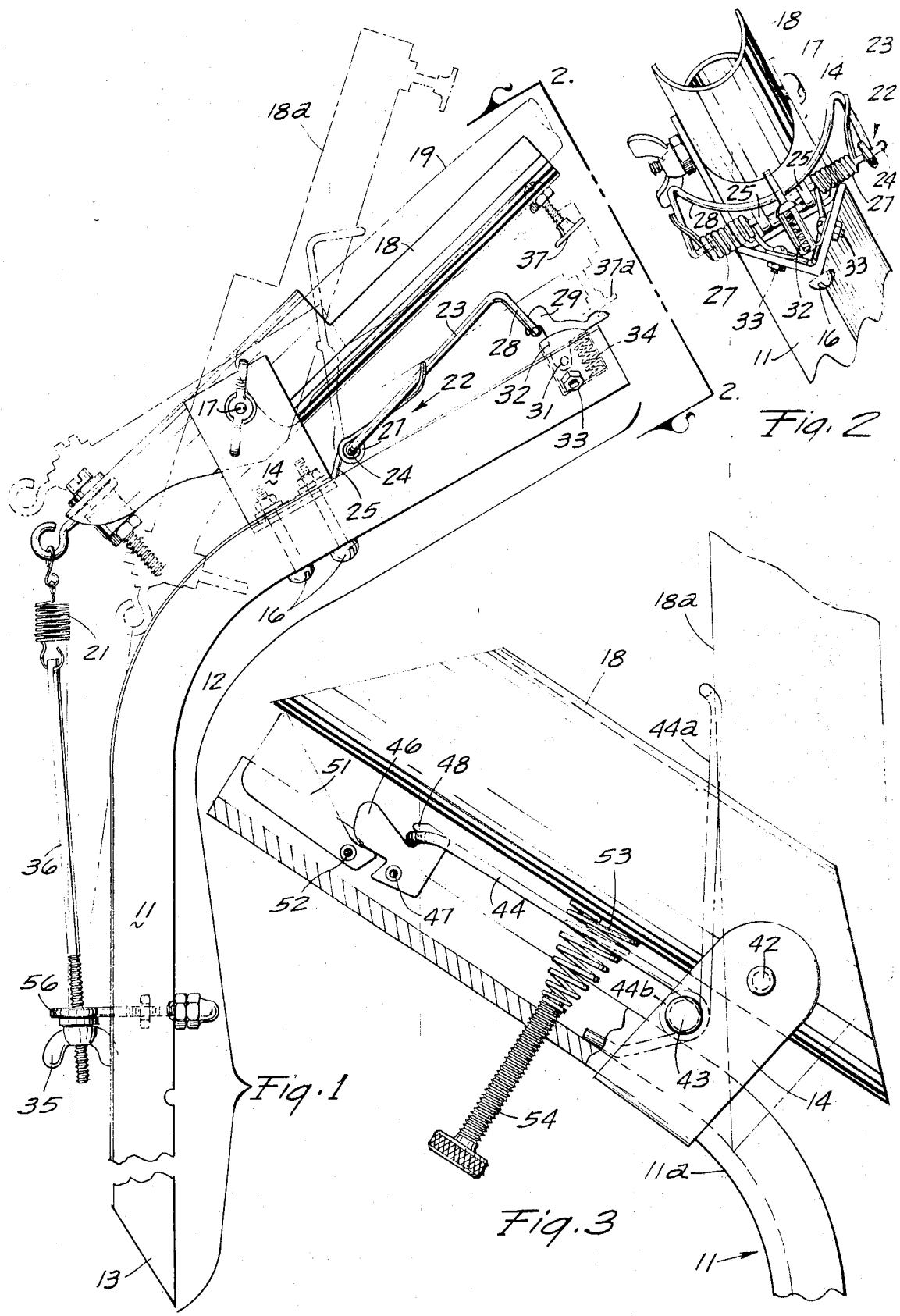

FISHING ROD HOLDER

FIELD OF THE INVENTION

This invention relates generally to fishing equipment and, more particularly, to an improved fishing rod holder.

BACKGROUND OF THE INVENTION

Up to now, fishing rod holders have been subjected to one or more significant disadvantages. In some, cocking involves a time consuming and complicated operation. In others, the means for tripping the latching mechanism for releasively maintaining the device in a cocked position is incapable of being adjusted to the desired sensitivity and rod weight. This last mentioned defect tends to be either over sensitive such that environmental conditions like a strong wind causes it to trip prematurely. Some other prior art devices require a time consuming procedure in order to make the device ready for fishing, while in still others the mechanism is costly and complicated to manufacture.

OBJECTS OF THE INVENTION

An object of this invention is to provide a fishing rod holder that is economical and simple, and substantially duplicates the maneuvers of a fisherman.

Another object is to provide a self-cocking rod holder which can be quickly and easily made ready for use.

Another object of this invention is to provide a predetermined resistance to the bite of a fish before the pole is snapped to hook the fish.

Another object of this invention is to provide a device of the type described that is capable of being used effectively with a wide variety of rod and reel combinations.

These and other objects and features of advantage of the invention will become more apparent after studying the following detailed description of the invention, together with the appended drawings.

BRIEF DESCRIPTION OF THE DRAWINGS

FIG. 1 is an elevation of one embodiment of the invention.

FIG. 2 is a view taken on line 2—2 of FIG. 1 in the direction of the arrows.

FIG. 3 is an elevation of another embodiment of the invention.

DETAILED DESCRIPTION OF THE DRAWINGS

Referring to FIG. 1 in particular, the novel device or holder is shown in the elevation and ready for catching a fish. The holder is mounted on a stake made out of, for example, one inch angle iron formed with a bent 12 and a point 13 which can be pressed into the banks of a stream. Above the bent 12 is disposed a U-shaped clamp 14 suitably bolted in place by bolts and nuts assembly 16. On the clamp 14 mounted for rotation about a horizontal axis as defined by bolt and wingnut assembly 17 is a fishing rod mounting tube 18. The handle of the suitable fishing rod 19 is shown by dashed lines. A tension spring 21 is suitably mounted between stake 11 and tube 18, to urge rotation of the tube 18 counter-clockwise, as viewed against the weight of the fishing rod. Between the tube 18 and the stake 11 is disposed a mouse-trap like spring assembly 22, consisting of a steel rectangular loop 23 disposed to rotate about an axis devised by one of its elements 24 which is in turn suitably mounted with an eyelet bolt 25 mounted on a lower portion of clamp 14. Suitable coil springs 27 are employed to urge the loop in a counter-clockwise rotation as viewed in FIG. 1 Another element 28 of the loop 23 is made semi-cylindrical for obvious reasons and is shown in FIGS. 1 and 2 engaged by a suitable latch 29. The latch 29 is pivotably mounted on a pin 31 to a suitable housing 32 that is in turn bolted to stake 11 by screw and nut assemblies 33. A compression spring 34 urges the latch counter-clockwise so that the loop 23 could be readily latched or cocked into position as shown.

In operation the loop 23 is cocked by placing it into a position as shown. The fishing rod is baited and cast, and the handle of the rod is disposed within the tube 18. The weight of the rod 19 will cause tension to be developed within the tension spring 21. Preferably the tension is adjusted in spring 21 by turning a wingnut 35 that engages a threaded rod 36 so that a hammer 37 is spaced from and does not contact the latch 29. The distance between the hammer and the latch should be minimal but should allow the pole 19 to sway due to wind and stream currents without triggering the trap spring assembly 22. When a fish bites and pulls on the hook, the fish pulls against tension spring 21, which provides some resistance to allow the hook to set into the fish. When the hammer 37 contacts the latch 29, as shown by dashed lines 37a, the loop 23 is released to allow coil springs 27 to rotate the loop counterclockwise as viewed. Since the loop is spaced from the tube 18, the loop 23 gains momentum before contacting the tube 18 causing the tube 18 or rod 19 to snap about the bolt and wignut assembly 17 to the position shown by dashed lines 18a. This snapping motion causes the hook to further set. The force developed by the spring 27 is much greater than the force developed by the spring 21 in order that the fish would not rotate the pole 19 downward or clockwise, as viewed, after the loop 23 is tripped.

FIG. 3 shows another embodiment of the invention with fewer parts than the embodiment shown in FIG. 1. Like numerals refer to like items. This embodiment also includes the stake 11. The U-shaped clamp 14 is shown welded around a stake portion 11a, pivotably engaging the tube 18 by a pin 42. Also mounted on clamp 14 upon a pin 43 is a mouse-trap like spring 44 which also has the loop 23 made in the shape of, for example, a U-shaped portion 44a with both ends forming coiled springs 44b which are disposed about pin 43. The U-shaped portion 44a engages a keeper 46 pivotably mounted upon a pin 47. The spring 44 engages a hook 48 on keeper 46 so that the line of force is through pin 47 and a keeper is unable to pivot. A trigger 51 is provided that pivots about a pin 52 so that when a fish causes the tube to rotate downward, the trigger is rotated, to rotate the keeper and releasing the trap spring 44 to the position shown by dashed lines 18a. In this embodiment a compression spring 53 is used to support the weight of the rod and reel off the trigger 51. The force therein is adjusted therein by thumb screw 54.

Although two embodiments of my invention are described, one skilled in the art, after studying the above description, could construct other embodiments utilizing the features of advantage taught herein. Therefore, the invention is not limited to the disclosed embodiment, but includes all embodiments falling within the scope of the claims.

I claim:

1. A fishing rod holder comprising:
a support member;
a fishing rod retainer pivotably mounted on said support member so that said retainer pivots substantially about a horizontal axis when in normal use;
a first spring means, normally disposed to act between said retainer and said support member to urge said retainer in one direction of rotation with respect to said member;
a second spring means, having a spring constant substantially less than said first spring means, also acting between said retainer and said support member to urge said retainer in the same said one direction of rotation with respect to said support member;
a cocking means on said support member for cocking said first spring means under an energy storage condition so that no urging of said retainer is performed;
a trigger means for releasing said cocking means to allow said first spring means to rotate said retainer when said retainer is urged a predetermined amount against said second spring means; and
an adjustable means on said second spring means to maintain said retainer spaced from said trigger means before a fish bites on the line of said rod.

2. The holder of claim 1 wherein said first spring means includes:
a loop means formed substantially rectangular,
mounting means for pivotably mounting said loop means on an axis to said support member so that the axis of rotation is located near the axis of rotation of said retainer and parallel thereto; and
coil spring means cooperating with said loop means to cause said loop means to be urged away from said support member.

3. The holder of claim 2 wherein said second spring means includes:
a tension spring mounted between said support member and said retainer;
said adjustment means includes an eyebolt mounted on said support member;
a rod fixed at one end to said tension spring and having threads on the other end which is passed through said eyebolt; and
a wingnut threaded on to said threaded end.

4. The holder of claim 2 wherein said second spring means includes a compression spring mounted between said support member and said retainer;
said adjustment means includes a threaded bolt;
said support member has a threaded hole into which said threaded bolt is threaded; and
said compression spring is mounted on the end of said bolt and bearing against said retainer.

5. The holder of claim 3 wherein said cocking means includes:
a latch having a hook pivotably connected on said member,
said hook engaging said loop means; and
a spring biasing said latch in a direction to allow said loop to be readily engaged by said hook.

6. The holder of claim 3 wherein said cocking means includes:
a latch pivotably connected on said support member;
said latch having a hook disposed so that when said loop means is engaged in said hook, the line of force of said loop means is through said axis of rotation of said latch, and
a trigger pivotably disposed on said support member and disposed to engage said latch when said trigger is pivoted by said retainer.

7. The holder of claim 2 wherein:
said loop means comprises: a U-shaped fixture;
said coil spring means including coil springs formed on both ends of said fixture and axially aligned directed toward each other;
a pin disposed through said coil springs and mounted to said support member.

8. The holder of claim 5 wherein:
said loop means comprises: a U-shaped fixture;
said coil springs means including coil springs formed on both ends of said fixture and axially aligned directed toward each other;
said mounting means includes:
a pin disposed through said coil springs and mounted to said support member.

9. The holder of claim 6 wherein:
said loop means comprises: a U-shaped fixture;
said coil springs means including coil springs formed on both ends of said fixture and axially aligned directed toward each other;
a pin disposed through said coil springs and mounted to said support member.

* * * * *